United States Patent [19]
Yanagimoto

[11] Patent Number: 5,617,186
[45] Date of Patent: Apr. 1, 1997

[54] FILM CARRIER OF PHOTOGRAPHIC PRINTER WITH ADJUSTABLE MASK

[75] Inventor: Takekazu Yanagimoto, Kaisei-machi, Japan

[73] Assignee: Fuji Photo Film Co., Ltd., Kanagawa, Japan

[21] Appl. No.: 580,204

[22] Filed: Dec. 28, 1995

[30] Foreign Application Priority Data

Feb. 27, 1995 [JP] Japan .................................... 7-038271

[51] Int. Cl.⁶ .................................................. G03B 27/53
[52] U.S. Cl. ............................................... 355/75; 355/126
[58] Field of Search ................................ 355/75, 76, 125, 355/126

[56] References Cited

U.S. PATENT DOCUMENTS

| | | | |
|---|---|---|---|
| 4,353,645 | 10/1982 | Kogane et al. ............................ | 355/75 |
| 4,450,536 | 5/1984 | Schroeder .................................. | 355/75 |
| 5,343,272 | 8/1994 | Hicks ........................................ | 355/75 |

Primary Examiner—Joan H. Pendegrass
Attorney, Agent, or Firm—Sughrue, Mion, Zinn, Macpeak & Seas

[57] ABSTRACT

A film carrier of a photographic printer which is designed so that trimming for each frame can be made by a simple manual operation, and the trimming position can be readily confirmed, and that the photographic film and the film carrier can be readily returned to the original center position. The film carrier has a pair of upper and lower masks (32 and 20) for holding a photographic film (50) to be printed therebetween. The film carrier further has a film guide groove (23) for guiding the photographic film (50) to a position where it is to be held between the lower mask (20) supported by a lower mask support frame (1) and the upper mask (32) supported by an upper mask support frame (2), and a screw mechanism (6 and 7) for moving the upper mask (32) relative to the lower mask (20), which is secured to the photographic printer, in a direction perpendicular to the film feed direction in the film plane, together with the film guide groove (23). The screw mechanism (6 and 7) is provided with a click mechanism.

5 Claims, 3 Drawing Sheets

FILM CARRIER OF PHOTOGRAPHIC PRINTER WITH ADJUSTABLE MASK

BACKGROUND OF THE INVENTION

The present invention relates to a film carrier of a photographic printer. More particularly, the present invention relates to a film carrier used for printing with trimming.

In a photographic printer, a film carrier is used in order to hold flat an image frame of a photographic film set in a printing position. The film carrier is made up of a lower mask on which the photographic film is placed, and an upper mask that holds the photographic film between it and the lower mask. During transfer of the photographic film, the upper mask is withdrawn upward so as not to damage the photosensitive emulsion layer of the film; during printing, the upper mask is pressed downward by a solenoid to hold the photographic film flat.

The lower and upper masks are each provided with an opening (image window) corresponding to the image frame of the photographic film. When ordinary printing, which needs no trimming, is to be carried out, the lower and upper masks are positioned so as to coincide with the image frame position of the photographic film.

In the photographic printer, a photographic printing paper is held on the stage by a paper mask. At this time, the exposure area on the photographic printing paper may be regulated by the opening of the paper mask (e.g., when a print with border is to be made; when printing is to be effected in a small region on the photographic printing paper; when multi-region printing is to be carried out to print a school photograph or the like; and so forth). In such a case, the image windows per se of the upper and lower masks of the film carrier do not regulate the exposure area on the photographic printing paper.

Incidentally, it is necessary in order to effect trimming printing to adjust the position of the photographic film on the film carrier with respect to the optical axis of the photographic printer in the longitudinal direction of the film (hereinafter referred to as "film feed direction") and in a direction perpendicular to the film feed direction in the film plane (this direction will hereinafter be referred to as "direction perpendicular to the film feed direction"). In trimming printing of a roll film, the adjustment of the frame position of the film in the film feed direction can be made by adjusting the film feed position. However, the frame position adjustment in the direction perpendicular to the film feed direction requires an extremely troublesome operation (for example, see U.S. Pat. No. 4,931,829); the adjusting operation is particularly troublesome in an inexpensive manual-type photographic printer (which has no function that enables monitoring the state of trimming on a CRT or other image display screen). Even a photographic printer having a trimming mechanism involves some problems: it is not easy to confirm the actual trimming position; it is difficult to see where the actual trimming position is; a complicated operation is required in which the upper mask is moved to determine a trimming position, and further the film is moved so that the trimming center position coincides with the optical axis.

SUMMARY OF THE INVENTION

In view of the above-described problems of the prior art, an object of the present invention is to provide a film carrier of a photographic printer which is designed so that trimming for each frame can be made by a simple manual operation, and the trimming position can be readily confirmed, and that the photographic film and the film carrier can be readily returned to the original center position.

To attain the above-described object, the present invention provides a film carrier of a photographic printer which has a pair of upper and lower masks for holding a photographic film to be printed therebetween. The film carrier further has a film guide device for guiding the photographic film to a position where it is to be held between the upper and lower masks, and a position adjusting device which is capable of moving one of the masks relative to the other mask, which is secured to the photographic printer, in the direction perpendicular to the film feed direction, together with the film guide device.

In this case, it is desirable that the mask that is secured to the photographic printer should be the lower mask, and that the other, movable mask should be the upper mask.

The film carrier may further include a lower mask support frame for exchangeably supporting the lower mask, and an upper mask support frame for exchangeably supporting the upper mask. In this case, the upper mask support frame is slidably mounted on the lower mask support frame. Moreover, the upper mask support frame is provided with a film guide groove which serves as the film guide device.

Further, the film carrier is preferably arranged such that the position adjusting device is a screw mechanism for adjusting a relative position of the lower and upper mask support frames, and the screw mechanism is provided with a click mechanism so that the screw mechanism is stopped by the click mechanism every time it rotates through a predetermined angle.

Further, it is preferable to provide a position mark that indicates a relative position of the lower and upper mask support frames.

Thus, in the present invention, the film carrier has a film guide device for guiding a photographic film to a position where it is to be held between a pair of upper and lower masks, and a position adjusting device which is capable of moving one of the masks relative to the other mask, which is secured to the photographic printer, in the direction perpendicular to the film feed direction, together with the film guide device. Accordingly, it is possible to effect trimming for each frame by such a simple operation that the movable mask is moved for positional adjustment. Thus, it is possible to determine the frame position in the direction perpendicular to the film feed direction while observing the image window of the mask that is secured to the photographic printer. Therefore, it is easy to confirm the trimming position. In addition, the photographic film and the film carrier can be readily returned to the original center position.

It should be noted that, if the position adjusting device is provided with a click mechanism, and a position mark is provided, it becomes easier to confirm the trimming position and to return the photographic film and the film carrier to the original center position.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

One embodiment of the photographic printer film carrier according to the present invention will be described below in detail with reference to the accompanying drawings.

Figure 1:
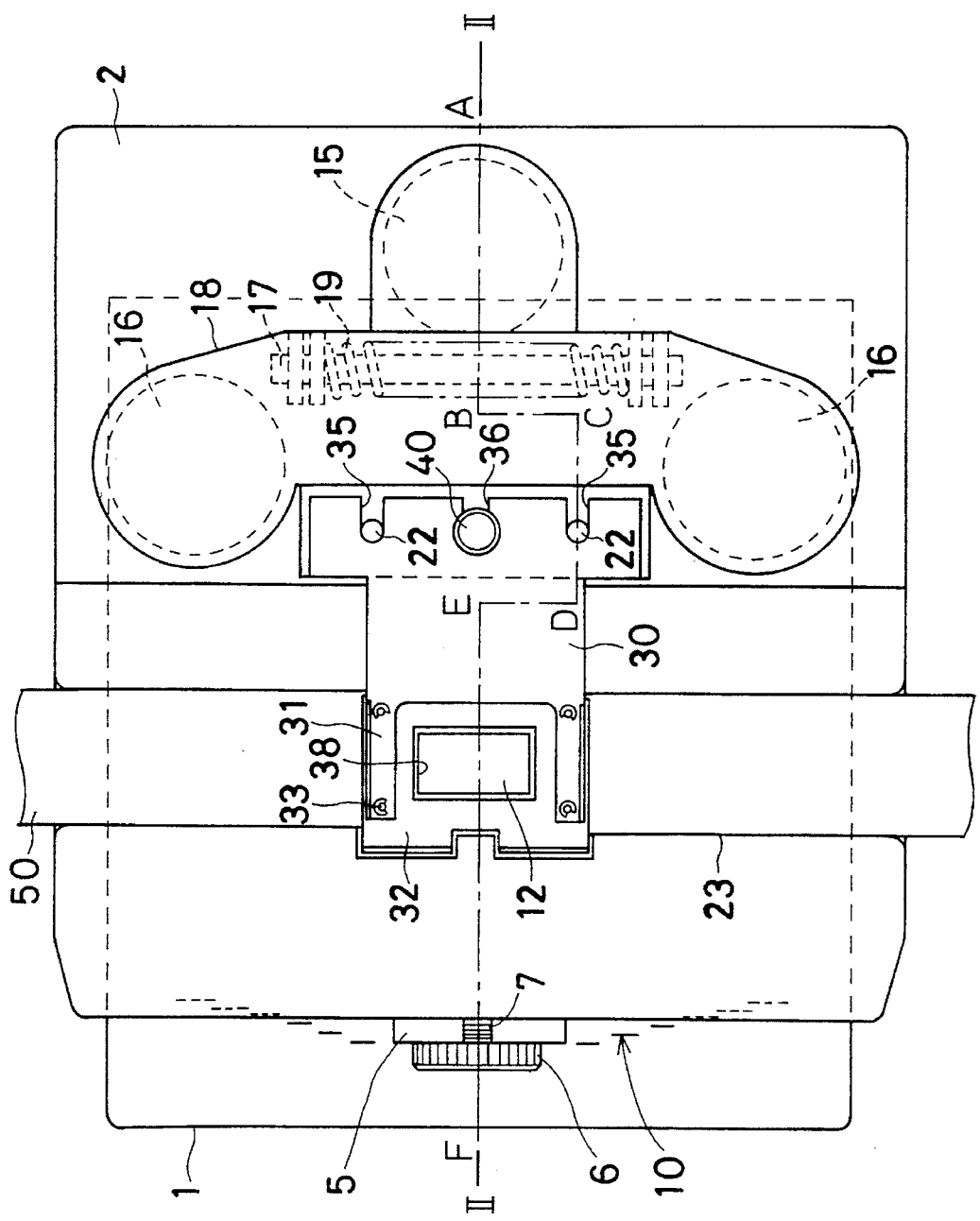
FIG. 1 is a plan view of one embodiment of the film carrier according to the present invention.
Figure 2:
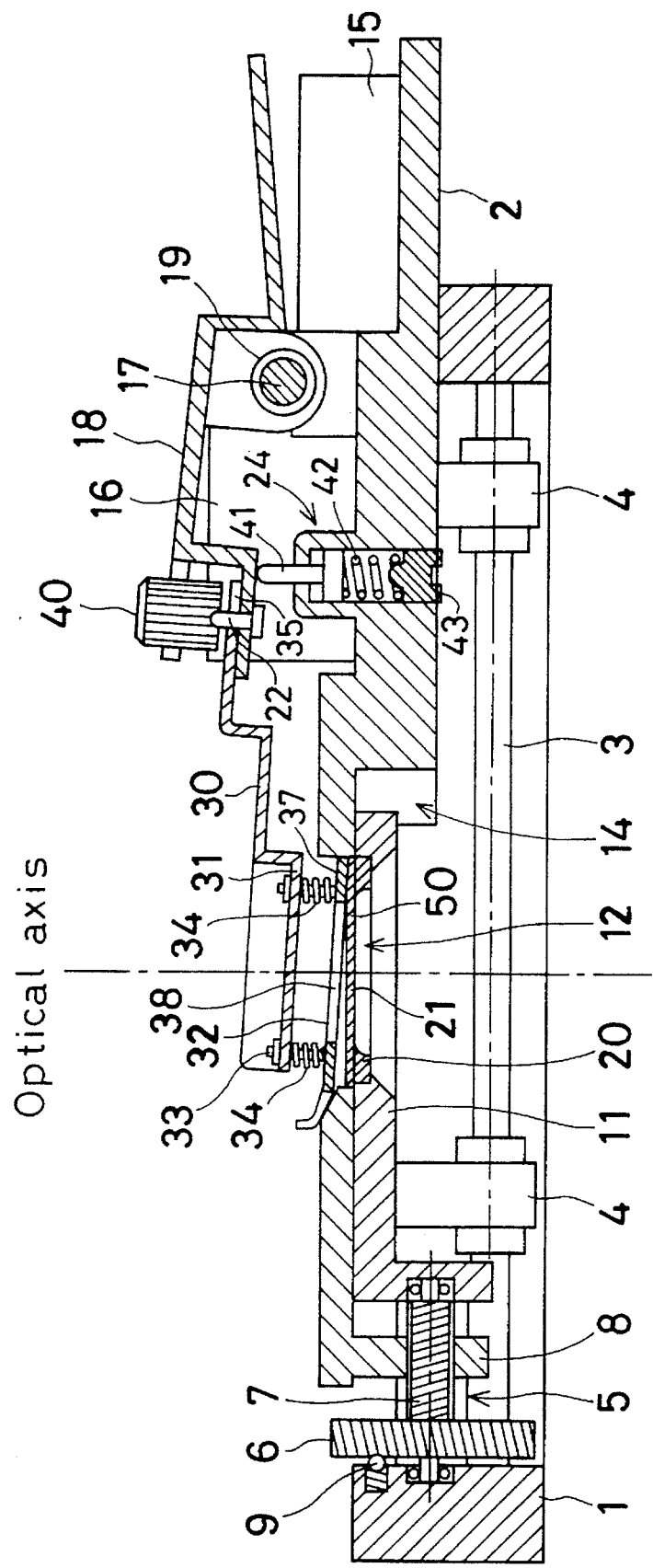
FIG. 2 is a sectional view taken along the line II—II (A-B-C-D-E-F) in FIG. 1.
Figure 3:
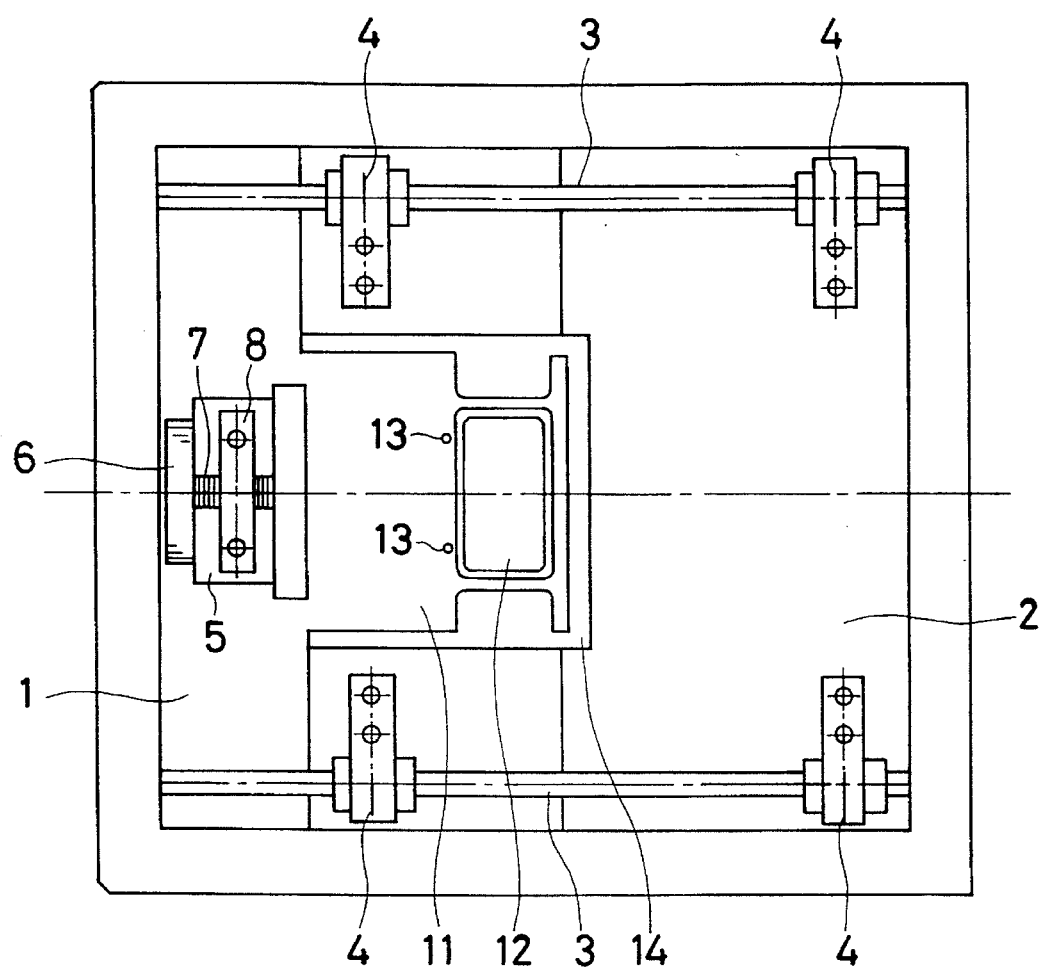
FIG. 3 is a bottom plan view of the embodiment of the film carrier according to the present invention.

FIG. 1 is a plan view of one embodiment of the film carrier according to the present invention; FIG. 2 is a sectional view taken along the line II—II (A-B-C-D-E-F) in FIG. 1; and FIG. 3 is a bottom plan view of the film carrier.

In one embodiment of the present invention, the film carrier is roughly made up of a lower mask support frame 1 and an upper mask support frame 2. The upper mask support frame 2 is mounted on the lower mask support frame 1 so as to be slidable in a breadthwise direction (i.e. horizontally as viewed in FIGS. 1 to 3). To allow the upper mask support frame 2 to be slidably mounted on the lower mask support frame 1, two parallel guide rails 3 are secured to the lower mask support frame 1 so as to extend breadthwise along the lower surface of the lower mask support frame 1, and four leg portions 4 of the upper mask support frame 2 extend through a cut portion of the lower mask support frame 1 and are slidably fitted on the guide rails 3, two leg portions 4 for each guide rail 3.

The lower mask support frame 1 has an opening 5 which is provided in the center of the left end portion thereof. A screw 7 which is integrated with a rotary dial 6 is provided in the opening 5 in parallel to the guide rails 3 and rotatably attached to the lower mask support frame 1. The screw 7 is engaged with a leg portion 8 of the upper mask support frame 2 which extends downward from the left end of the support frame 2. Further, a click mechanism 9 is provided between the rotary dial 6 and the wall of the opening 5 of the lower mask support frame 1. The click mechanism 9 causes the rotary dial 6 to stop every time the dial 6 rotates through a predetermined angle (e.g. one half turn of the rotary dial 6). The surface of the lower mask support frame 1 is provided with a plurality of position marks 10 for indicating the breadthwise position of the left end of the upper mask support frame 2 so that positions at which the rotary dial 6 is stopped by the click mechanism 9 correspond to the position marks 10, respectively.

The lower mask support frame 1 has a lower mask support portion 11 which is integrally provided approximately in the center of the support frame 1. The distal end of the lower mask support portion 11 is provided with an opening 12 for passing illuminating light from a light source (not shown) provided below the film carrier. The upper periphery of the opening 12 is provided with a recess, and a pair of upwardly extending pins 13 are provided in the recess. A lower mask 20 having an image window 21 is exchangeably fitted into the recess at the periphery of the opening 12 with the pins 13 used as positioning members. The lower mask support portion 11 having the lower mask 20 attached thereto can slide breadthwise in a groove 14 which is provided at the corresponding position on the lower surface of the upper mask support frame 2.

The upper mask support frame 2 is provided with a pressing-raising mechanism. The pressing-raising mechanism is made up of a raising solenoid 15, two pressing solenoids 16, a driving lever 18 which pivots about a supporting point 17, and a spring 19 for biasing the driving lever 18 counterclockwise as viewed in FIG. 2. The upper mask support frame 2 is further provided with an adjusting device 24 for adjusting the biasing force of the spring 19. The adjusting device 24 is adapted to adjust the biasing force of the spring 19 for biasing the driving lever 18, thereby adjusting the force with which an upper mask 32 presses on a film 50. The adjusting device 24 is made up of a projecting pin 41 for retaining the driving lever 18, a spring 42 for biasing the projecting pin 41, and an adjusting screw 43. By changing the position to which the adjusting screw 43 is screwed in, the force with which the projecting pin 41 pushes up the driving lever 18 is adjusted.

Further, a pressing movable frame 30 is exchangeably attached to the driving lever 18. The pressing movable frame 30 is made up of an engagement retaining member 31 which is exchangeably attached to the driving lever 18, and an upper mask 32 having an image window 38. The upper mask 32 is supported by the engagement retaining member 31 through upwardly extending pins 33 which are provided in four corners, respectively, of the upper mask 32. Further, the upper mask 32 is biased by springs 34 which are fitted on the pins 33, respectively. The pressing movable frame 30 can be exchangeably attached to the driving lever 18 by fitting positioning cut portions 35, which are provided in the engagement retaining member 31, with positioning pins 22 which are erected on the driving lever 18, and further fastening tight the peripheral portion of a mounting cut portion 36, which is provided in the engagement retaining member 31, with a screw 40.

Further, the surface of the upper mask support frame 2 is provided with a film guide groove 23 extending in the feed direction of a photographic film 50, which is perpendicular to the guide rails 3, so that the image window 38 of the upper mask 32, which is pressed by the pressing movable frame 30, matches each frame of the photographic film 50.

When ordinary printing, which needs no trimming, is to be carried out by using the film carrier of the present invention, arranged as described above, the raising solenoid 15 is turned on to raise the upper mask 32 of the pressing movable frame 30 from the lower mask 20. Then, the film 50 is inserted into the space between the upper and lower masks 32 and 20 from the curved distal end of the upper mask 32. The film 50 is set so as to be movable along the film guide groove 23 provided on the upper mask support frame 2, and a frame of the film 50 which is to be printed is aligned with the image window 38 of the upper mask 32. After the film loading process, the raising solenoid 15 is turned off. Consequently, the driving lever 18 is pivoted counterclockwise about the supporting point 17 by urging force from the spring 19, causing the pressing movable frame 30 to lower toward the lower mask 20. Since the pressing movable frame 30 has the upper mask 32 attached through the springs 34 to the engagement retaining member 31, which is secured to the driving lever 18, the pressing movable frame 30 stops in a state where an end side 37 of the upper mask 32 presses lightly on the film 50.

When the film 50 is to be printed, the two pressing solenoids 16 are energized, and consequently, the driving lever 18 further pivots counterclockwise from the position shown in FIG. 2. The pivoting of the driving lever 18 causes the film 50 to be strongly pressed by the whole upper mask 32. Thus, the film 50 is pressed on the lower mask 20.

The film 50 is illuminated with light passing through the opening 12 of the lower mask support portion 11 and through the image window 21 of the lower mask 20, and light passing through the film 50 further passes through the image window 38 of the upper mask 32. Therefore, when the shutter (not shown) of the photographic printer opens, the image of the illuminated frame of the film 50 is printed on a photographic printing paper (not shown) through a paper mask.

Upon completion of printing for one frame, the pressing solenoids 16 are turned off. Consequently, the driving lever 18 is pivoted clockwise by urging force from the springs 34 and 42, and stops at the position shown in FIG. 2, where the spring force balances with the operating force of the spring 19. After the printing process, the film 50 is moved through a distance corresponding to one frame. At that time, since the film 50 is lightly held by a part of the upper mask 32, the film 50 can be smoothly fed along the film guide groove 23 without being damaged.

When trimming printing is to be carried out by using the film carrier of the present invention, the adjustment of the trimming position in the film feed direction is made by adjusting the film feed position along the film guide groove 23 so that the frame position is adjusted as desired.

The adjustment of the trimming position in the direction perpendicular to the film feed direction is made by moving the upper mask support frame 2 by a predetermined amount relative to the lower mask support frame 1, which is secured to the printer body, along the guide rails 3, thus moving the upper mask 32 and the photographic film 50 as one unit.

That is, when the rotary dial 6 is turned clockwise or counterclockwise, the screw 7, which is integrated with the rotary dial 6, also turns, causing the upper mask support frame 2 to move relative to the screw 7 along the guide rails 3 through the leg portion 8, which is in thread engagement with the screw 7. The lower mask 20, which is attached to the lower mask support portion 11 of the lower mask support frame 1, is fixed to the printer body, and the optical axis passes through the center of the lower mask 20. Therefore, the operator may determine the frame position of the film 50 in the direction perpendicular to the film feed direction while observing the image window 21 of the lower mask 20. In a case where trimming movement quantities have already been determined in advance testing, the frame position may be determined from the number of times of stop made by the click mechanism 9, which regulates the rotation of the rotary dial 6, or by observing the position marks 10 provided on the surface of the lower mask support frame 1.

When the upper mask support frame 2 is moved relative to the lower mask support frame 1 as described above, the film 50 placed in the film guide groove 23 on the upper surface of the upper mask support frame 2 moves, together with the upper mask 32 pressing lightly the film 50 against the lower mask 20, through a distance determined by the amount of rotation of the rotary dial 6 in the direction perpendicular to the film feed direction. Thus, the film 50 is set in the trimming position.

Thereafter, the pressing solenoids 16 are energized to strongly press the film 50 with the whole upper mask 32, thereby allowing the film 50 to be pressed on the lower mask 20. Then, the shutter of the photographic printer is opened to print the trimming image of that frame of the film 50 on the photographic printing paper through the paper mask, in the same way as in the above-described ordinary printing process.

To return the film carrier and the film 50 to the position for ordinary printing, which needs no trimming, after the above-described trimming printing, it is only necessary for the operator to turn the rotary dial 6 while observing the position marks 10, or watching the upper and lower masks 32 and 20 become coincident with each other. Thus, the film carrier and the film 50 can be returned to the position for ordinary printing by an extremely easy operation.

Although the photographic printer film carrier of the present invention has been described above by way of one embodiment, it should be noted that the present invention is not necessarily limited to the described embodiment, and that various changes and modifications may be imparted thereto. Particularly, the pressing-raising mechanism has been described for illustrative purposes only; therefore, it may be omitted. The essential thing in the present invention is to arrange a film carrier, which is made up of a pair of upper and lower masks for holding a photographic film therebetween, so that one of the masks can be moved relative to the other mask in the direction perpendicular to the film feed direction, together with a film guide device. Although in the foregoing embodiment the present invention is applied to a photographic printer in which illuminating light for printing passes from the lower mask side to the upper mask side, it should be noted that the present invention is similarly applicable to a photographic printer in which illuminating light for printing passes from the upper mask side to the lower mask side in inverse relation to the above. In this case also, the lower mask, which actually lies on the lower side, should preferably serve as a mask which is secured to the photographic printer from the viewpoint of operability.

As has been detailed above, the photographic printer film carrier of the present invention has a film guide device for guiding a photographic film to a position where it is to be held between a pair of upper and lower masks, and a position adjusting device which is capable of moving one of the masks relative to the other mask, which is secured to the photographic printer, in the direction perpendicular to the film feed direction, together with the film guide device. Accordingly, it is possible to effect trimming for each frame by such a simple operation that the movable mask is moved for positional adjustment. Thus, it is possible to determine the frame position in the direction perpendicular to the film feed direction while observing the image window of the mask that is secured to the photographic printer. Therefore, it is easy to confirm the trimming position. In addition, the photographic film and the film carrier can be readily returned to the original center position.

It should be noted that, if the position adjusting device is provided with a click mechanism, and a position mark is provided, it becomes easier to confirm the trimming position and to return the photographic film and the film carrier to the original center position.

What is claimed is:

1. A film carrier of a photographic printer which has a pair of upper and lower masks for holding a photographic film to be printed therebetween, said film carrier comprising:

film guide means for guiding the photographic film to a position where it is to be held between said upper and lower masks; and position adjusting means capable of moving one of said masks relative to the other mask, which is secured to said photographic printer, in a direction perpendicular to a film feed direction in a film plane, together with said film guide means.

2. A film carrier according to claim 1, wherein said mask that is secured to said photographic printer is the lower mask, and said other, movable mask is the upper mask.

3. A film carrier according to claim 2, further comprising:

a lower mask support frame for exchangeably supporting said lower mask; and an upper mask support frame for exchangeably supporting said upper mask, said upper mask support frame being slidably mounted on said lower mask support frame, and said upper mask support frame being provided with a film guide groove which serves as said film guide means.

4. A film carrier according to claim 3, wherein said position adjusting means is a screw mechanism for adjusting a relative position of said lower mask support frame and said upper mask support frame, said screw mechanism being provided with a click mechanism so that said screw mechanism is stopped by said click mechanism every time it rotates through a predetermined angle.

5. A film carrier according to claim 3, further comprising a position mark that indicates a relative position of said lower mask support frame and said upper mask support frame.

\* \* \* \* \*